Feb. 21, 1933.  J. MacLAREN  1,898,552
INDICATING GAUGE
Filed June 23, 1931
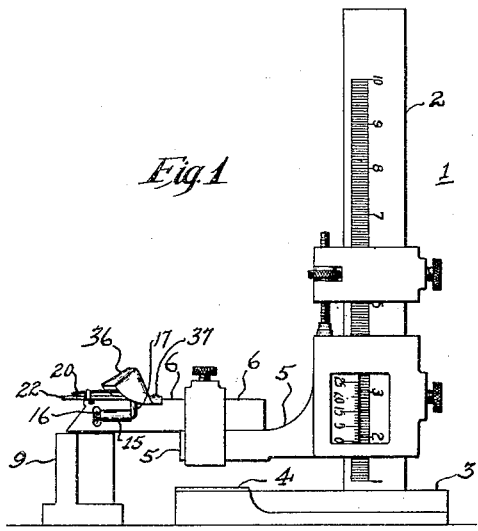
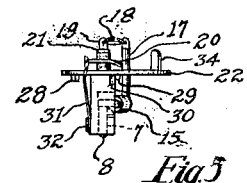
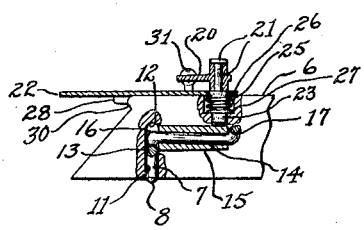
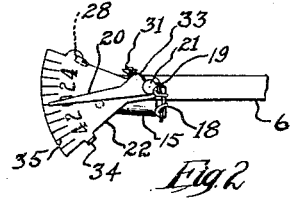
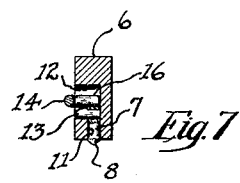
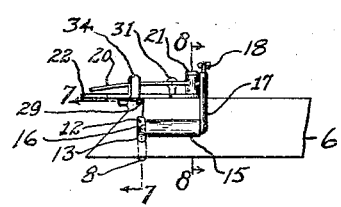
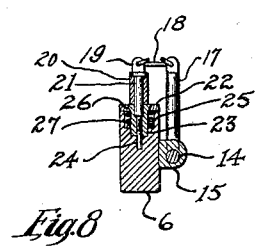
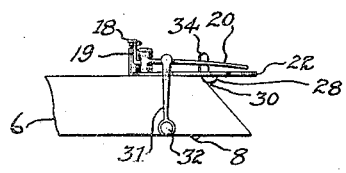
INVENTOR
John MacLaren,
BY
ATTORNEY Patented Feb. 21, 1933

1,898,552

UNITED STATES PATENT OFFICE

JOHN MacLAREN, OF HILLSIDE, NEW JERSEY

INDICATING GAUGE

Application filed June 23, 1931. Serial No. 546,189.

This invention relates, generally, to gauges; and the invention has reference, more particularly, to a novel indicating gauge adapted for visually indicating measurements and especially micrometer measurements, the said gauge being particularly adapted for use as an attachment, as on typical gauges, such as on vernier height gauges.

Heretofore, in measuring objects accurately it was customary to use gauges equipped with verniers. This necessitates considerable effort and the expenditure of considerable time where many similar objects are measured since a coarse adjustment of the movable jaw of the gauge and then a fine adjustment of this jaw by the use of the vernier attachment must usually be made for each object measured, and also necessitates the careful reading of the vernier which entails considerable time and effort.

The principal object of the present invention lies in the provision of an indicating gauge which is so constructed and arranged as to visually indicate micrometer measurements of objects.

Another object of the present invention is to provide a novel indicating gauge which is especially adapted for use in conjunction with vernier height gauges or other typical gauges, said indicating gauge serving to visually indicate accurately small measurements, whereby the same may be used to detect and indicate small variations in measurements between similar objects without the necessity of making micrometer adjustments, thereby eliminating the making of fine gauge adjustments as well as the necessity of vernier readings.

Still another object of the present invention lies in the provision of a novel indicating gauge having a graduated sector plate, together with a pointer movable over said sector plate for directly indicating small measurements, the said pointer being operated by a lever system which is adapted to be actuated by the objects measured.

A further object of the present invention is to provide a novel indicating gauge of simple, rugged construction and which is easily and quickly used in practice.

Other objects of this invention, not at this time more particularly enumerated, will be clearly understood from the following detailed description of the same.

The invention is clearly illustrated in the accompanying drawing, in which:

Fig. 1 is a view in elevation showing a vernier height gauge equipped with the novel indicating gauge of the present invention, the said indicating gauge being illustrated as provided with a protective hood.

Fig. 2 is an enlarged plan view of a portion of the structure shown in Fig. 1.

Fig. 3 is a view looking at one side of the structure shown in Fig. 2.

Fig. 4 is a view looking at the other side of the structure shown in Fig. 2.

Fig. 5 is an end view of the structure shown in Fig. 2.

Fig. 6 is an enlarged view similar to Fig. 3 but with parts broken away.

Fig. 7 is an enlarged sectional view taken substantially along line 7—7 of Fig. 3; and Fig. 8 is an enlarged sectional view taken substantially along line 8—8 of Fig. 3.

Similar characters of reference are employed in all of the above described views, to indicate corresponding parts.

Referring now to said drawing, the reference numeral 1 designates a vernier height gauge having a bar 2 mounted on a base 3 provided with a stationary jaw 4. The movable jaw 5 is illustrated as provided with the usual extension or scriber 6, which scriber is illustrated as carrying the novel indicating gauge of this invention. Although the indicating gauge of this invention is illustrated as applied to a vernier height gauge, it is to be understood that the same is also applicable to other types of standard gauges.

The indicating gauge comprises a vertical plunger 7 having its lower end somewhat pointed to provide a contact point 8 for engaging the objects to be measured such as the work 9 illustrated in Fig. 1. Plunger 7 is vertically slidable within a conforming cylindrical recess 11 extending upwardly within the jaw extension 6 from the bottom thereof. The upper end of recess 11 terminates in a recess 12 extending inwardly from one side of the extension 6. The upper end portion of plunger 7 is illustrated as having a transverse stop pin 13 attached thereto, which stop pin by engaging the lower wall of recess 12 is adapted to limit the downward movement of plunger 7. With plunger 7 in its lowermost position, as illustrated in Fig. 7, the central point 8 projects below the bottom of the extension 6.

A lever 14 is pivotally mounted within a bearing aperture provided in a lug 15 positioned on the side of extension 6. Lever 14 has an inturned arm 16 projecting into recess 12, which arm is adapted to engage the upper end of plunger 7. Lever 14 is also provided with an upwardly extending arm 17 which has its upper end connected to one end of a transversely extending wire link 18. The other end of wire link 18 is connected to an upturned arm 19 provided on a pivoted pointer or needle member 20. The pointer or needle member 20 is pivotally mounted on a vertical headed pin 21, which pin extends downwardly and has a reduced end portion 24 fixed within a conforming recess provided in the body of the extension 6. The pointer member 20 is adapted to move over a graduated sector plate 22, which sector plate is mounted for limited turning adjustment about the pivotal pin 21.

A collar 23 is positioned within a recess 25 in surrounding relation to the pin 21. The lower end portion of collar 23 is fixedly mounted within a reduced end portion of the recess 25. The upper portion of collar 23 is conically tapered at 26 for cooperating with a correspondingly tapered aperture provided in the sector plate 22. It will be apparent that pin 21 may be secured to collar 23 as by a press fit in the vertical aperture of this collar. Since pin 21 is fixed within collar 23 the lower end of this pin need not extend into the body of extension 6 if desired.

A coil compression spring 27 is positioned within recess 25 in surrounding relation to collar 23 and presses upwardly against sector plate 22, so that the tapered aperture of the sector plate snugly engages the tapered portion of collar 23. The frictional engagement between these cooperating conical tapered portions of the sector plate and collar, serves to hold the sector plate in any selected position, as the same is turned or adjusted angularly about the collar 23. The sector plate 22 is provided with stops 28 and 29 on the undersurface thereof, which stops by engaging the opposite sides of a lug 30 formed on the end of jaw extension 6, are adapted to limit the adjustable turning movement of the sector plate. The sector plate is adapted to be frictionally held at any selected point between its limits of motion by the action of spring 27 and the cooperating conical tapered portions of collar 23 and the sector plate 22.

A vertical leaf spring 31 has its lower end attached as by a pin 32 to the side of jaw extension 6. The upper end of leaf spring 31 engages a boss 33 formed on the pointer 20. Leaf spring 31 by pressing against boss 33 urges the pointer 20 counterclockwise, as viewed in Fig. 2, and tends to hold this pointer in engagement with an upturned stop 34 provided on the marginal edge of sector plate 22. Leaf spring 31 by turning the pointer 20 counterclockwise, as viewed in Fig. 2, causes link 18 to actuate lever 14 to effect the depression of plunger 7, so that the contact point 8 of this plunger projects below the bottom of jaw extension 6.

In use, when the movable jaw 5 of the height gauge is adjusted so that the extension 6 engages the work 9, it will be found that this work, by contacting with contact point 8 of the plunger 7, acts to urge this plunger upwardly, thereby effecting clockwise movement of the pointer 20 over sector plate 22. The graduations 35 on the sector plate 22 are preferably in thousandths of an inch and read from zero at the center of the sector plate to six thousandths at the side edges of the sector plate, thereby enabling the ready visual reading of micrometer measurements. Owing to the angular adjustability of the sector plate 22, deviations of work or objects from a standard measurement is readily detected and read directly in thousandths of an inch or any other suitable measure without the necessity of making vernier adjustments or readings. Thus, if the sector plate 22 is turned so that the pointer 20 reads zero, for example, when a standard object is being measured, then slight dimensional variations in other and similar objects from standard is directly indicated by the pointer 20 and may be read in thousandths of an inch. If the pointer moves to the right of the zero position on the sector plate as viewed in Fig. 2, then the object being measured is oversize and if the pointer moves to the left of the zero position the object is undersize. Owing to the frictional engagement between the sector plate 22 and the collar 23, the sector plate will remain in any angularly adjusted position desired. A hood 36 is adapted to be attached to the top of extension 6 as by rivets 37, which hood overlies the lever 14, link 18 and associated parts in protecting relation.

The novel indicating gauge of this invention is particularly valuable when a plurality of similar pieces of work 9 are to be measured. For example, the jaw 5 and sector plate 22 may be set so that pointer 20 reads at zero when a standard piece of work 9 is placed under the jaw extension 6. Thereafter any slight variations in succeeding pieces of work are immediately detected by the pointer 20 which will indicate variations from standard directly on the scale 35.

It is to be understood that the novel indicating gauge of this invention does not take the place of the usual vernier attachment of the height gauge, but is adapted to be used in conjunction with the vernier attachment to aid in making rapid readings and eliminate the making of many vernier readings.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed:

1. In combination, a supporting jaw extension having a recess therein and an indicating gauge carried by said jaw extension, said indicating gauge comprising a plunger movable within the recess of said jaw extension, said plunger having a contact point on the outer end thereof adapted to project exteriorly of said jaw extension, a stop projection provided on said plunger for limiting the outward movement of said contact point, a pointer pivotally mounted on said jaw extension, a link pivotally connected to said pointer, a lever pivotally mounted on the side of said jaw extension, said lever having an inturned arm engaging said plunger and an upturned arm connected to said link for interconnecting said link with said plunger, whereby movements of said plunger will cause amplified movements of said pointer, a sector plate having graduations thereon underlying said pointer, leaf spring means carried by said jaw extension and engaging said pointer for urging the latter toward one side edge of said sector plate, said sector plate having stop means thereon for limiting the movement of said pointer under the action of said spring means, said sector plate being angularly adjustable about the pivotal axis of said pointer, and stops provided on said sector plate for engaging said jaw extension to limit the angular adjustment of said sector plate.

2. In combination, a supporting jaw extension having a recess therein and an indicating gauge carried by said jaw extension, said indicating gauge comprising a plunger movable within the recess of said jaw extension, said plunger having a contact point on the outer end thereof adapted to project exteriorly of said jaw extension, a stop projection provided on said plunger for limiting the outward movement of said contact point, a pointer pivotally mounted on said jaw extension, said pointer having a boss on the side thereof, a link connected to said pointer, a lever pivotally mounted on said jaw extension and interconnecting said link with said plunger, whereby movements of said plunger will cause amplified movements of said pointer, a sector plate having graduations thereon underlying said pointer, spring means carried by said jaw extension and engaging the boss on said pointer for urging the latter toward one side edge of said sector plate, said sector plate having stop means thereon for limiting the movement of said pointer under the action of said spring means, said sector plate being angularly adjustable about the pivotal axis of said pointer, spring pressed friction means surrounding the pivotal axis of said pointer and engaging said sector plate for frictionally retaining said sector plate in adjusted position, and stops provided on said sector plate for engaging said jaw member to limit the angular adjustment of said sector plate.

In testimony, that I claim the invention set forth above I have hereunto set my hand this 20th day of June 1931.

JOHN MacLAREN.